United States Patent
Cahill et al.

[15] 3,668,399
[45] June 6, 1972

[54] GAUGE USING ENVIRONMENT-INSENSITIVE RADIATION BEAM CROSS-SECTION LIMITER

[72] Inventors: Bonaventure B. Cahill, Ft. Mitchell, Ky.; Wilfred W. Lyon, Cincinnati, Ohio

[73] Assignee: The Ohmart Corporation, Cincinnati, Ohio

[22] Filed: June 30, 1969

[21] Appl. No.: 837,681

[52] U.S. Cl. .................................. 250/83.3 D, 250/105
[51] Int. Cl. .................................. G21f 5/02, H01j 35/16
[58] Field of Search .................. 250/83.3 D, 49.5 TE, 105

[56] References Cited

UNITED STATES PATENTS 2,938,124   5/1960   Boyd .................................. 250/83.3 D Primary Examiner—Anthony L. Birch
Attorney—Wood, Herron & Evans

[57] ABSTRACT

Gauge for measuring the characteristics of a specimen including a shielded source of radiation, a detector spaced from said source, a radiation beam cross-section limiter through which radiation from the source passes as it travels along a path for impingement upon the specimen which is located in a gap between the limiter and the source for selectively blocking and unblocking radiation from the source. The radiation beam cross-section limiter includes a bore sealed at both ends through which the radiation from the source passes in its path to the specimen and detector. By virtue of the sealed beam-limiting bore the mass of material contained within the bore, which usually is air, remains constant independent of changes in the environment, such as changes in environmental temperature, barometric pressure, humidity and the composition of the surrounding gas, thereby substantially reducing errors in the gauging process introduced by such environmental changes.

12 Claims, 1 Drawing Figure

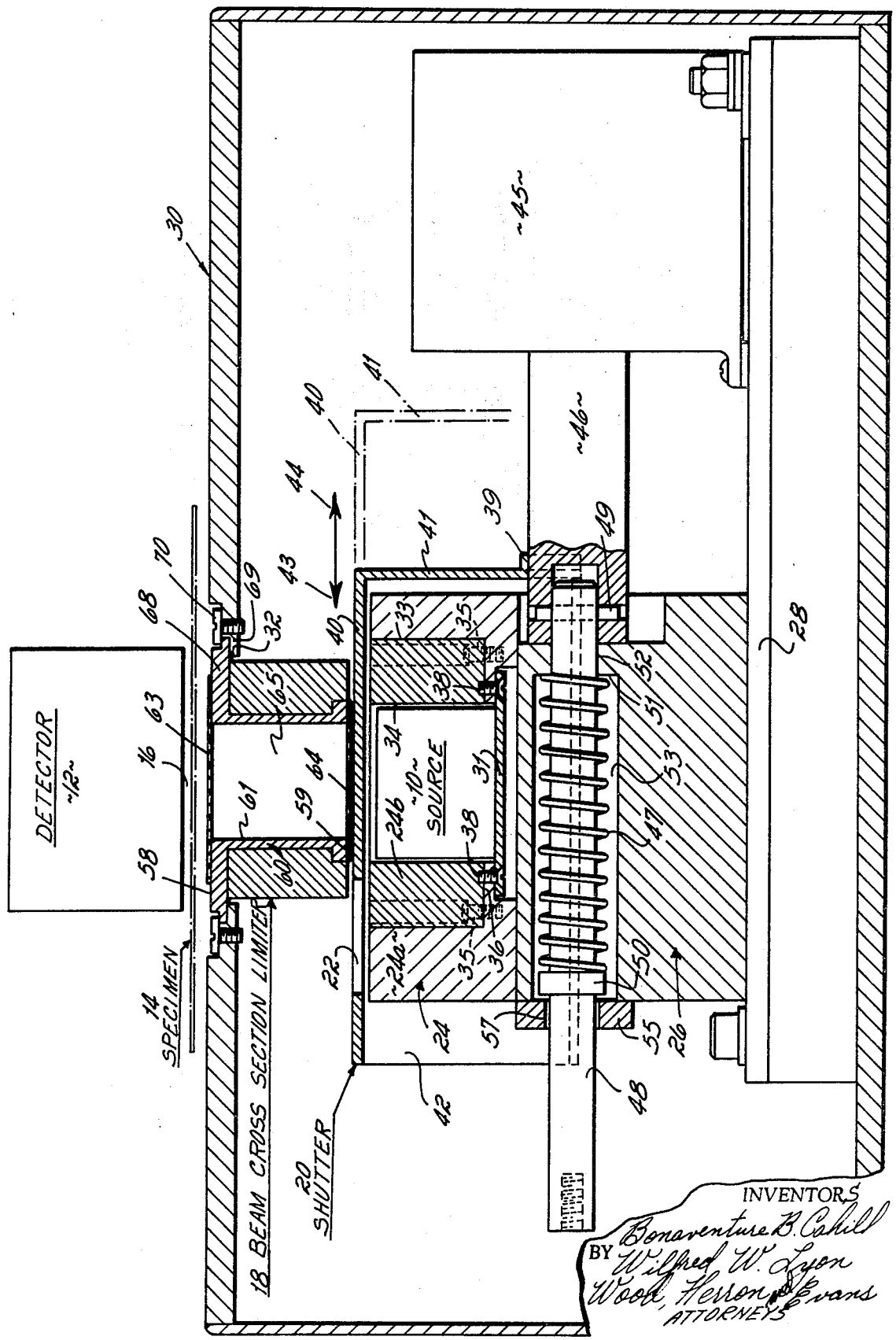

GAUGE USING ENVIRONMENT-INSENSITIVE RADIATION BEAM CROSS-SECTION LIMITER

This invention relates to radiation gauges adapted to measure the properties of a specimen on which the radiation impinges, and more particularly to radiation gauges which are rendered substantially independent of fluctuations in the environment in which the gauge is used.

In many gauging applications wherein a beam of radiation from a source is impinged upon a specimen whose characteristics are to be measured, it has been found desirable to limit the cross-section of the beam of radiation which irradiates the specimen. In such applications where beam cross-section limitation is desirable, the source of radiation is typically spaced from the specimen a distance ranging from 1 to 4 inches and the radiation emitted by the source passed through a suitable beam cross-section limiting device, such as an elongated hollow tube, interposed between the source and specimen. The radiation from the source, in the course of traveling through the tube in its path from the source to the specimen, has its cross-section limited by interaction with the internal walls of the tube.

Typically, the beam cross-section limiting tube communicates with the environment of the gauge. At one end the tube freely communicates with an air gap in which the specimen is positioned, defined by the beam cross-section limiter and a suitably disposed detector which receives radiation transmitted through the specimen. The other end of the beam cross-section limiter is positioned adjacent the source to permit capture, or entry, of radiation emitted by the proximately located source for transmission to the specimen.

One very serious problem associated with gauge configurations and geometries of the type described, wherein a hollow beam cross-section limiter tube is interposed between the radiation source and the air gap in which the specimen is located, is that certain of the parameters of the material in the beam limiting tube, which typically is air, vary markedly with respect to certain reference parameters for which the gauge is standardized or calibrated. These parameters of the material in the tube subject to variation include temperature, barometric pressure, humidity, and composition. Of these parameters, one of the more important and, accordingly one which is discussed below in detail for illustrative purposes, is the variation in tube air temperature.

Variations in tube air temperature are primarily caused by departures in temperature of the specimen from the reference temperature. For example, in one particular application wherein the gauge is used to measure the thickness of paper sheet stock typically having a temperature of approximately 165° F., if the gauge is standardized or calibrated at the beginning of a paper stock run before the gauging components and environment, including the air in the beam cross-section limiting tube, have come to thermal equilibrium with the paper being measured, the temperature of the air in the beam limiter tube can change by as much as 90° F. (50° C.) during the course of the measuring operation.

The problem with changes in temperature of the air in the beam cross-section limiting tube is that the mass per unit area of the column of air in the cavity defined by the interior of the tube, and through which the beam of radiation emitted by the source must pass in its path of travel to the specimen, changes at the rate of approximately 0.3 percent per °C. For a 2 ½ inch air column, in which the mass per unit area of air column is 7.67 mg./cm$^2$, the change in mass per unit area for the air column is 0.023 mg./cm$^2$ per °C. In a gauging application of the type described for measuring the thickness of paper sheet stock where, for example, the full scale deflection is 0.9 mils or 3.2 mg./cm$^2$, the error introduced into the thickness measurement is approximately 0.72 percent per °C. If the temperature of the air column changes by 50° C., from the temperature at which the gauge was standardized or calibrated, which is not unusual in paper thickness applications of the type described, an error of approximately 36 percent is introduced into the thickness measurement.

It has been an objective of this invention to substantially eliminate, in radiation gauges of the type utilizing hollow beam cross-section limiting tubes or the like which communicate with the environment, gauging errors introduced by changes in parameters of the air column in the beam limiting tube from those at which the gauge was standardized or calibrated. This objective has been accomplished in accordance with the principles of this invention by utilizing an extremely simple, but extraordinarily unobvious, approach which is predicated upon the concept of interposing means in the beaming limiting tube to render the mass of the material which is in the tube substantially insensitive to variation in the environment, such as variations in environmental temperature, barometric pressure, humidity and gas composition. In accordance with a preferred arrangement, the interposed means is a fluid-tight chamber filled with air through which the radiation beam passes in the course of having its cross-section limited. Although certain of the parameters of the air in the chamber, for example, its temperature, vary as the ambient temperature changes, the mass of the air is invariant. Thus, gauging errors of the type noted, wherein the mass of the air column in the beam limiter varies with environmental changes, such as temperature changes, are substantially eliminated.

It has been a further objective of this invention to provide, in a gauge of the type utilizing a sealed beam cross-section limiting chamber interposed between the radiation source and detector and further utilizing a movable shutter to selectively block radiation, means for protecting the gauging components from contamination by foreign matter such as dust and dirt in the environment. This objective has been accomplished by enclosing the source and operatively positioned shutter in a housing in which is provided therein an aperture which receives the sealed beam limiting chamber and thereby effectively seals the housing, and hence, the source and shutter, from the environment.

These and other advantages and objectives of the invention will become more readily apparent from a detailed description thereof taken in conjunction with the drawings in which the single FIGURE is a vertical cross-sectional view through the center of the detector, beam limiter, shutter and shielded source.

With reference to the FIGURE, a preferred embodiment of radiation gauge incorporating the principles of this invention is seen to include a source of radiation 10 and a radiation detector 12. The detector 12 is positioned to receive radiation from the source 10 which is transmitted through a specimen 14, whose characteristics are to be measured, interposed between the source and detector in an air gap 16. A radiation beam cross-section limiter 18 is positioned between the air gap 16 and the source of radiation 10 for restricting or limiting the cross-section of the radiation beam impinging upon the specimen 14. A shutter mechanism 20 having an aperture 22 selectively registerable with the source 10 and beam cross-section limiter 18 is provided to control the impingement of radiation from the source 10 upon the specimen 14. Lateral and lower radiation shields 24 and 26 mounted on a frame 28 partially surround the source 10 to prevent harmful radiation emitted by the source 10 from reaching the gauge surroundings or environment. A housing 30 having an aperture 32 into which the beam cross-section limiter 18 fits encloses the source 10, lateral and lower shields 24 and 26, shutter mechanism 20, and frame 28.

The source 10 may take a variety of forms depending upon the thickness and composition of the specimen 14 whose properties are being gauged. In accordance with one preferred use of the gauge of this invention, wherein the thickness of polymer films such as polyethylene terephthalate are measured, a suitable source 10 is Krypton–85 which is a beta-emitting radioactive isotope having a maximum beta energy of 0.67 MEV. Such sources are commercially available from the American Atomics Corporation, Tuscon, Arizona, designated model number 400022. A flat plate 31 having marginal apertured edge portions to accommodate screw fasteners is fixed to the source 10 to facilitate mounting.

The lateral shield 24 is preferably comprised of an outer lateral shield member 24a having a square horizontal cross-section, and an inner lateral shield 24b having an annular horizontal cross-section. The inner shield 24b is snugly positioned in a bore 33 formed in the outer lateral shield 24a, and the source 10 is positioned within a bore 34 formed in the inner annular shield 24b. Suitable screw fasteners 35 secure the annular shield 24b in the bore 33 of the outer shield 24a. When so secured the lower surface of the annular shield 24b contacts a shoulder 36 formed in the bore 33 to locate the upper surface of the inner shield flush with the upper surface of the outer lateral shield 24a. The circular shoulder 36 also locates the source 10 by virtue of the mounting plate 31 which is secured in contact with the lower surface thereof by fasteners 38. The lower shield 26, like the lateral shield 24, preferably has a square horizontal cross-section. Suitable means (not shown) secure the lateral shield 24 to the lower shield 26 which in turn is secured to the frame 28. The shields 24 and 26 are preferably fabricated of lead.

The shutter mechanism 20 includes a planar horizontal upper plate 40 in which is formed the aperture 22. A side plate 41 as well as a rear plate 42 and a front plate (not shown) disposed parallel to the rear plate are integral with and extend vertically downwardly from one side edge and the rear and front edges, respectively, of the plate 40. The plate 40 is bi-directionally movable in a horizontal plane in the direction of arrows 43 and 44 between a radiation blocking position (shown in solid lines) wherein the aperture 22 formed in the plate 40 is not registered with the bore 34 and a radiation unblocking position (shown in phantom lines) wherein the aperture 22 is registered with the bore 34. To facilitate bi-directional movement of the plate 40 a solenoid 45 is provided having a horizontally extending core 46 secured to the side plate 41 via a flange mount 39.

When the solenoid 45 is in the de-energized condition the core 46 and plate 40 are positively located in the position shown in solid lines by a compression spring 47 which is located in a cavity 53 formed in lower shield 26. The compression spring 47 is mounted on a horizontal shaft 48 between a collar 50 fixed to the shaft 48 and a stationary shoulder 51 surrounding a bore 52 which slidably receives one end of the shaft. Shaft 48 is secured to the free end of the core 46 via a pin 49. A guide bushing 55 is secured to the lower shield 26 and is provided with a bore 57 which slidably receives the other end of the shaft 48.

In operation, when the solenoid 45 is energized the core 46 is retracted and shifts laterally in the direction of arrow 44 compressing the spring 47 to move the aperture 22 into registry with the bore 34 and allow radiation from the source 10 to impinge upon the specimen 14.

The thickness and composition of the plate 40 is selected to block radiation from the source 10 when plate 40 is in the radiation blocking position shown in solid lines.

The beam cross-section limiter 18 includes a bushing 60 having a circular cross-section bore 61 formed therein which defines a cylindrical cavity or chamber 65 through which a beam of radiation from the source 10 is adapted to pass and the beam cross-section thereof limited. The upper and lower ends of the bore 61 are sealed by radiation penetrable windows 63 and 64. Preferably the windows 63 and 64 are fabricated of 1 mil thick polyethylene terephthalate film which have their marginal edge portions adhered to the surfaces 58 and 59 of the bushing 60 with which they mate. A suitable adhesive such as that marketed by Armstrong Products Co., Inc., Warsaw, Indiana, designated "Armstrong C-9 Adhesive," has been found to satisfactorily bond the film windows 63 and 64 to bushing end surfaces 58 and 59, respectively.

With the upper and lower ends of the bore 60 of beam cross-section limiter 18 sealed by radiation penetrable windows 63 and 64, the cylindrical cavity 65 which limits the cross-section of the radiation beam is rendered fluid-tight. With the cavity 65 fluid-tight the mass of the material within the cavity 65 remains constant independent of fluctuations in the environment, such as fluctuations in environmental air pressure, humidity, barometric pressure or gas composition. With the mass of the material in the cavity 65 independent of environmental changes, gauging errors are substantially reduced in gauges of the type disclosed wherein beam cross-section limiters are utilized. In a preferred form of beam cross-section limiter 18 the cavity 65 is filled with air. However, if desired, the cavity 65 may be evacuated, that is, placed under a vacuum, or alternatively, partially or completely filled with some other suitable material. If desired, sealing of the cavity 65 can be dispensed with altogether by filling the cavity with a low density solid or liquid material whose mass does not change. The only restriction on the material located in cavity 65, whether or not it is sealed, is that it permits a usable amount of radiation from the source 10 to impinge upon the specimen 14 so as to permit a useful signal to be derived from the detector 12.

The bushing 60 has a radially extending circular flange 68. Flange 68 seats on a circular lip 69 formed in the housing 30 which defines the circular aperture 32. Suitable fasteners 70 secure the flange 68 in place on the lip 32 and effectively seal the housing aperture 32. With the housing aperture 32 sealed, dust and other foreign matter is prevented from reaching the various components of the gauge which are enclosed within the housing, such as the shutter mechanism 20, source 10 and shields 24 and 26.

With the various components of the gauge of this invention in the position shown in solid lines in the figure, the gauge is in its inoperative condition. In the inoperative condition the plate 40 is positively driven by the compression spring 47 to the radiation-blocking position wherein the aperture 22 formed in the plate 40 is not registered with the bore 34 in which is located the source 10. With the plate 40 so positioned radiation from the source 10 is blocked by the plate and no radiation passes through the beam cross-section limiter 18 to impinge upon the specimen 14.

To render the gauge operative the solenoid 45 is energized. When the solenoid is energized its core 46 moves to the right overcoming the force of the spring 47. With the core 46 in its right-most position the shutter plate 40 is moved to the radiation unblocking position shown in phantom lines wherein the aperture 22 is registered with the bore 34 surrounding the source 10. Radiation from the source 10 passes through the aperture 22 into the cavity 65 where the beam cross-section is limited. The cross-section limited radiation beam emanating from the window 63 of the limiter 18 impinges upon the specimen 14, in turn providing a useful radiation input to the detector 12.

Following calibration of the gauge in any well-known manner, should a change occur in the cavity 65, such as the temperature of the cavity vary, due, for example, to changes in the temperature of the specimen 14, the mass of the material in the beam limiting cavity 65 does not change and thereby introduce error into the gauging process. By contrast, if the mass of the material in the beam limiting cavity 65 were not made independent of temperature by, for example, sealing the cavity 65, enormous errors could be introduced into the gauging operation by variations of the temperature of the material in the cavity from the temperature at which calibration was made. For example, it has been found that errors of approximately 36 percent are introduced into the gauging process by a 50° C. temperature change when a gauge, which has a Krypton-85 source and a 2 ½ inch long unsealed cylindrical beam-limiting cavity, is used to measure the thickness of paper sheet stock having a nominal thickness of 0.9 mils. However, by sealing or making fluid-tight the beam-limiting cavity, and thereby rendering the mass of the material enclosed therein constant and independent of temperature variations, errors in the gauging process introduced by a 50° C. change in temperature of the material in the beam-limiting cavity are substantially eliminated.

Departures in temperature of the air in the gap 16 due, for example, to variations in temperature of specimen 14, operate to introduce slight errors into the gauging process notwithstanding the use of the fluid-tight beam-limiting chamber 65. However, due to the relatively small mass per unit area of the air in the gap 16 relative to the mass per unit area of the specimen 14, any such error due to departures in temperature of the air in gap 16 from the temperature at which calibration was made are kept to manageable proportions.

An advantage of this invention attributable to the unique interrelation of the aperture housing 30, limiter 18, shutter 20 and shielded source 10 is that the entire assembly is fully enclosed, thereby preventing the operative components from being exposed to foreign matter in the environment such as dust or the like. Additionally, there are no externally located moving parts to complicate the problem of sealing the housing 30.

The invention has been described with respect to avoiding gauging errors due to variations in the mass of the material in a radiation beam cross-section limiter, such as a collimator, due to the variations in the environment, such as fluctuations in environmental temperature, humidity, barometric pressure, and gas composition. However, the principles of this invention have utility in other applications. For example, the principles of this invention wherein a constant mass, that is, a mass independent of environmental changes, is interposed in the radiation beam between the radiation source and detector, can also be utilized in "off-sheet" air gap standardization applications. In gauging applications of the general type described the gauge is periodically standardized when "off-sheet," that is, when the gauge has moved off the specimen and the specimen being measured is not in the air gap. To facilitate such "off-sheet" standardization, means having a mass which is independent of environmental changes may be interposed in the air gap, that is, interposed in the space between the collimator, if one is used, and the detector, when the gauge is "off-sheet" and the specimen not in the air gap. The constant mass means interposed in the air gap may take many forms and may, for example, be in the form of a fluid-tight chamber which is evacuated or filled with a gas such as air. Alternatively, the constant mass may constitute some other means whose mass does not change with variations in the environment such as a low density solid or liquid.

Having described the invention what is claimed is:

1. A radiation gauge for measuring the characteristic of a specimen comprising:
   a source of radiation spaced from said specimen for directing a beam of radiation having a predetermined cross-section through a specified length path toward said specimen,
   means interposed between said source and said specimen having a cross-section and length at least substantially coextensive with the cross-section and length of said beam, said means having a volume and mass which does not vary significantly with variations in gauge environment,
   a detector adapted to receive radiation from said beam after said radiation has interacted with said specimen, and
   a frame mounting said source and detector in a predetermined physical relationship relative to each other which is independent of said variations in gauge environment.

2. The gauge of claim 1 wherein said interposed means includes a fluid-tight chamber.

3. The gauge of claim 2 wherein said chamber is filled with gas whose entrapped mass does not significantly change with variations in the environment of said gas.

4. The gauge of claim 3 wherein said gas is air.

5. The gauge of claim 2 wherein said chamber is evacuated.

6. The gauge of claim 1 further including a collimator associated with said source for establishing said predetermined beam cross-section upon exit therefrom.

7. A radiation gauge for measuring the characteristic of a specimen,
   a source of radiation spaced from said specimen for directing a beam of radiation through a specified length path toward said specimen,
   a detector positioned to receive said beam of radiation after transmission through said specimen,
   means interposed between said source and said specimen through which said beam travels throughout substantially the entire length of said path, said means having a volume and mass which does not vary significantly with variations in gauge environment, and
   a frame mounting said source and detector in a predetermined physical relationship relative to each other which is independent of said variations in gauge environment.

8. A radiation gauge comprising:
   a source of radiation;
   a detector spaced from said source,
   a collimator associated with said source for directing a beam of radiation along a specified length path from said source to said detector, and
   a specimen interposed between said collimator, and said detector through which said beam is transmitted, said specimen having a mass per unit area which is approximately the same order of magnitude as the mass per unit area of a volume of air having the dimensions of said beam,
   means interposed between said source and said specimen through which said beam travels throughout substantially the entire length of said path, said means having a volume and mass which does not vary significantly with variations in gauge environment, and
   a frame mounting said source and detector in a predetermined physical relationship relative to each other which is independent of said variations in gauge environment.

9. The gauge of claim 8 wherein said collimator includes a through bore and wherein said constant mass interposed means is positioned within said bore.

10. The gauge of claim 9 wherein said bore is gas-tight and wherein said constant mass interposed means is gas enclosed within said gas-tight bore.

11. The gauge of claim 10 wherein said gas is air.

12. Apparatus for use in radiation gauging of a specimen comprising:
   a source of radiation,
   a radiation shield fixed relative to said source for enclosing said source, said shield having an aperture therein through which a beam of radiation from said source passes,
   a radiation beam cross-section limiter associated with said source, said limiter having a bore for defining the cross-section of said beam as said beam passes therethrough along a specified path from a radiation entry end mounted adjacent said shield aperture to a radiation exit end mounted adjacent to said specimen, said bore ends being sealed to render the mass enclosed by said sealed bore substantially independent of variations in gauge environment,
   a detector adapted to receive radiation from said beam after said radiation has interacted with said specimen,
   a radiation impenetrable shutter mounted between said shield aperture and beam limiter for movement relative to said aperture between alternatively beam blocking and unblocking positions,
   a housing enclosing said source, shield, and shutter, said housing having an opening therein which receives said limiter thereby effectively sealing said opening, and
   a frame mounting said source and detector in a predetermined physical relationship relative to each other which is independent of said variations in gauge environment.

* * * * *